Feb. 11, 1958 O. D. COLVIN 2,822,743
APPARATUS FOR FORECASTING AND CONTROLLING ATMOSPHERIC CONDITIONS IN STORAGE COMPARTMENTS
Filed Oct. 12, 1953 4 Sheets-Sheet 1

INVENTOR.
OLIVER D. COLVIN.
BY
Nash, Neal, Hamilton, Orme & McElhannon
his ATTORNEYS.

Feb. 11, 1958 O. D. COLVIN 2,822,743

APPARATUS FOR FORECASTING AND CONTROLLING ATMOSPHERIC CONDITIONS IN STORAGE COMPARTMENTS

Filed Oct. 12, 1953 4 Sheets-Sheet 2

FIG. 3.

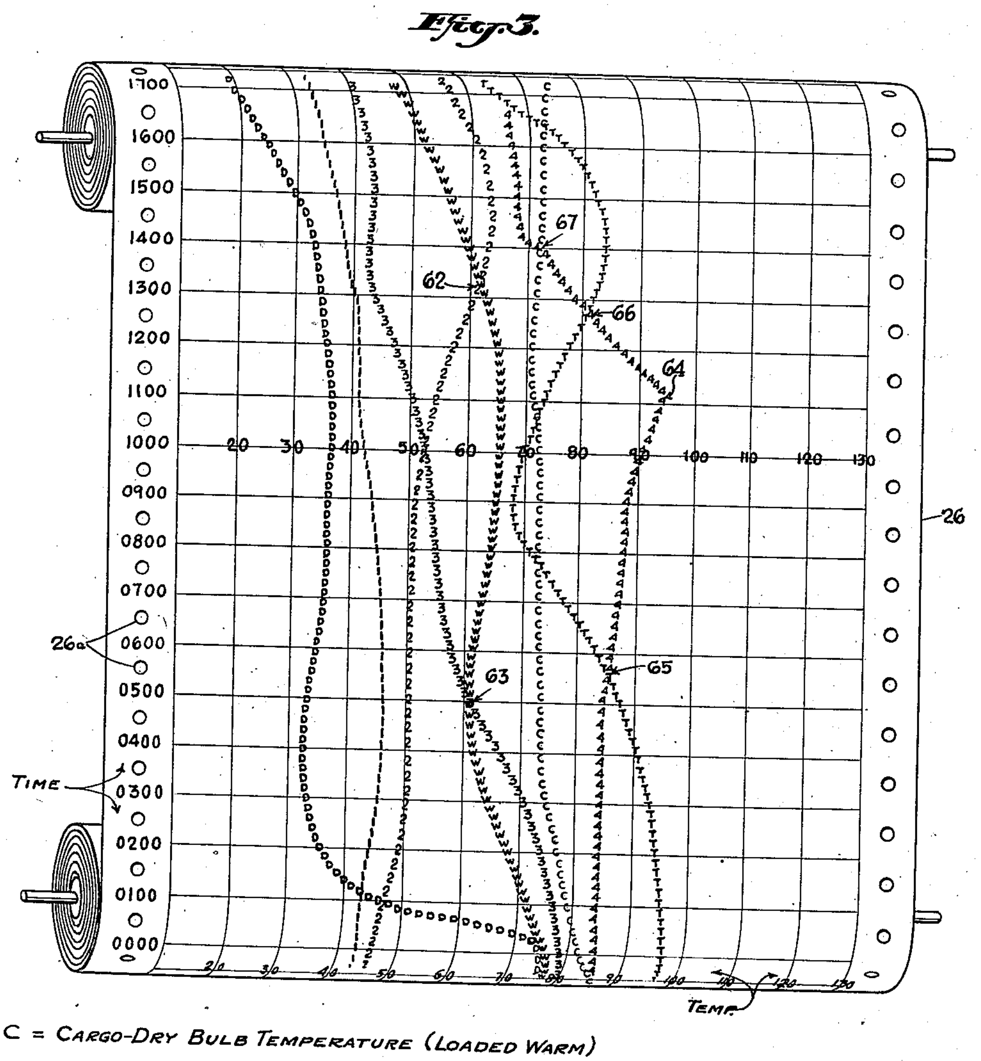

C = CARGO-DRY BULB TEMPERATURE (LOADED WARM)

T = WEATHER - DRY BULB TEMPERATURE

W = WEATHER - DEW POINT TEMPERATURE

D = DEHUMIDIFIER AIR DEW POINT TEMPERATURE

1 = TRACK H-D.P. TEMP., HOLD #1- {START ON RECIRCULATION / STAY ON RECIRCULATION}

2 = TRACK H-D.P. TEMP., HOLD #2- {START ON RECIRCULATION / CHANGE TO VENTILATION @ 1300}

3 = TRACK H-D.P. TEMP., HOLD #3- {START ON VENTILATION / CHANGE TO RECIRCULATION @ 0500}

4 = TRACK H-D.P. TEMP., HOLD #4- START WITHOUT V. OR R.
SHIP SWEAT @ 0530
START DH. AT 1100
SAFE @ 1245-DRYING BEGINS.

INVENTOR.
OLIVER D. COLVIN

BY
Ward, Neal, Haselton, Orme & McElhannon
his ATTORNEYS.

Feb. 11, 1958 O. D. COLVIN 2,822,743

APPARATUS FOR FORECASTING AND CONTROLLING ATMOSPHERIC CONDITIONS IN STORAGE COMPARTMENTS

Filed Oct. 12, 1953 4 Sheets-Sheet 3

INVENTOR.
OLIVER D. COLVIN,
BY
Ward, Neal, Haselton, Orme & McElhannon
his ATTORNEYS.

Feb. 11, 1958 O. D. COLVIN 2,822,743

APPARATUS FOR FORECASTING AND CONTROLLING ATMOSPHERIC CONDITIONS IN STORAGE COMPARTMENTS

Filed Oct. 12, 1953 4 Sheets-Sheet 4

INVENTOR.
OLIVER D. COLVIN.
BY
Ward, Neal, Haselton, Orme & McElhannon
his ATTORNEYS.

United States Patent Office 2,822,743
Patented Feb. 11, 1958

2,822,743

APPARATUS FOR FORECASTING AND CONTROLLING ATMOSPHERIC CONDITIONS IN STORAGE COMPARTMENTS

Oliver D. Colvin, Seattle, Wash.

Application October 12, 1953, Serial No. 385,642
6 Claims. (Cl. 98—53)

This invention relates to method and means for forecasting atmospheric conditions within a storage compartment, and more particularly to method and means for indicating, forecasting and, by advance remedial action, preventing sweat (aqueous condensate) producing conditions therein.

Because "prevention" by such advance remedial action requires substantially less energy and capacity than "cure" after the event, the present invention achieves one of its primary objects of controlling such atmospheric conditions with relatively small: (*a*) expenditure of power and energy and (*b*) capacity requirement as compared to the prior art which has been largely concerned with "cure" alone. Thus the present invention also achieves another main aim of lower capital cost, expense, smaller size of apparatus, and greater ease of installation as compared to prior methods and apparatus in this field. These objects and advantages are particularly important with respect to ships where space is at a premium and energy from the ship's power plant is carefully rationed.

The invention provides, upon a common surface and with reference to a common graph having a single origin point, a time track delineation of past and present dewpoint and dry bulb temperatures both within and without the storage compartment. The present trends of such temperatures are instantly readable and simultaneously comparable thereby providing an easily recognizable forecast of possible future sweat producing conditions (if any), and enabling advance remedial action to be taken where required.

One of the serious defects with prior art methods and systems for controlling atmospheric conditions in storage compartments has been the necessity to compute certain of the temperature values, such as dewpoint, by means of lengthy and tedious calculations which usually are based on information which is stale by the time the computation is made. Dewpoint values within and without the storage compartment have in the past been calculated by determining any two of the following three factors: relative humidity, wet bulb temperature, and dry bulb temperature. The determination of relative humidity has not been entirely satisfactory in the past because of the lack of reliability of the hygroscopic material employed, such as human hair, animal or vegetable fibre. Likewise the determination of wet bulb temperature, particularly aboard ship, has been subject to error due to difficulties, such as salt incrustation. The present invention employs, preferably but not necessarily, dewpoint sensing means known as "Dewcell" as disclosed in United States Patent No. 2,359,278, which device provides an accurate dewpoint indication. Further with respect to the control of atmospheric conditions in the holds of ships, it has been the practice in the past to obtain at least two of the aforementioned three basic factors for computing dewpoint, only a few times a day, perhaps two or three. Usually such basic factors are obtained and computations made irregularly and in an untimely manner.

In view of the fact that temperature within a storage compartment or the temperature of the outside atmosphere may change a substantial amount, for example, 40° in one hour, particularly with respect to a moving ship at sea, highly detrimental atmospheric conditions may exist within a cargo hold of such ship for some time before remedial action is taken. That is, such atmospheric conditions may be highly detrimental to the cargo and/or to the internal surfaces of the ship as caused by cargo sweat or ship sweat. Thus it is possible to have heavy cargo damage or ship corrosion if the remedial action is substantially delayed.

Furthermore, methods and apparatus heretofore suggested to meet this problem have failed to provide suitable or timely prognostication of atmospheric conditions within a storage compartment or within the several holds of a ship. Nor has such prior art provided means for indicating what not to do with respect to "ventilation" or "recirculation" of air in a storage compartment. In addition to this, as aforementioned, it is usual for the last known atmospheric conditions within the storage compartments to be several hours behind present conditions due to the tedious former procedures to obtain the basic aerological readings, the necessary psychrometric conversions and the like. Furthermore, skilled personnel have been required in the past to determine the aforementioned aerological factors. Such personnel of necessity have to have some knowledge of aerology of the climate in the hold and some knowledge of psychrometry.

One of the objects of the present invention is to overcome the above difficuties.

The invention in one aspect thereof comprises a system having in combination means for sensing the dewpoint temperatures and the dry bulb temperatures both within and without a storage compartment to which are operatively connected means for delineating upon a common surface and with respect to a single graph having a common origin point, a plurality of tracks, each in response to its respective temperature. Means are provided for moving such delineation means and surface with respect to one another in response to the passage of time, such temperatures thereby being shown whereby the latest delineated portions of the tracks (the track heads) are shown in accurate relative positions at any selected time, such delineating means thereby showing a continuous time record of the temperatures sensed by the sensing means. There is thus given an indication of past and present relations of such temperatures and the trends thereof whereby a prognostication of future atmospheric conditions within the compartment can be presently and instantaneously made.

The invention in another aspect thereof is constituted by a novel method for controlling atmospheric conditions within a storage compartment, including the delineation upon a surface, and with respect to a single graph (having a single or common origin point for all measured factors), of tracks respectively representing weather dry bulb temperature (T), weather dewpoint temperature (W), and compartment (or hold) dewpoint temperature (H), and recirculating within such compartment the atmosphere therein or alternatively ventilating such compartment with outside atmosphere, such recirculation or ventilation being with or without the introduction of dehumidified air into such compartment, in response to the latest delineated portion (track head) of the track of the compartment (hold) dewpoint temperature (H) taking certain positions with respect to substantially concurrent portions of the other two tracks (W and T). Normally W is always lower than T. Thus when such track head (H) is below both of the other two tracks in the value of its temperature indication, the atmosphere within such compartment is "recirculated" therein because the outside atmosphere has a higher dewpoint temperature (W) and thus is wetter and more liable to produce sweat. When such track head (H) is between the other two tracks (W and T), the compartment is "ventilated" with air from the outside atmosphere because the latter is lower in dewpoint temperature. In response to such track head (H) approaching from below (in temperature value) the track (W) of the weather dewpoint temperature, dry air may be introduced into such compartment, if desired, for preventing the crossing of such tracks (H and W) and if such crossing occurs, such recirculation is terminated and the aforementioned ventilation with outside atmosphere is initiated with or without the introduction of dry air. If such track head of the hold dewpwoint track (H) approaches from below the track (T) of the weather dry bulb temperature (the latter usually being substantially equal to the tempearture of the compartments' internal surfaces), an immediate prognostication of sweat upon the internal surfaces of the compartment can be made and as much dry air should be introduced into such compartment as is available to prevent the occurrence of such compartment sweat. The aforementioned introduction of dry air should be accompanied by ventilation of the compartment with the outside atmosphere because its dewpoint is lower. Should said track head of the compartment dewpoint (H) be discovered above both of the other two tracks (T and W) sweating is taking place and again dry air should be introduced into such compartment in as large a volume as is available, together with initiation of ventilation of such compartment thereby to bring such track head (H) below (in value) the weather dry bulb temperature track (T).

Various, further and more specific objects, features and advantages of the invention will clearly appear from the detailed description given below taken in connection with the accompanying drawings which form a part of this specification and illustrate, by way of example, preferred methods and arrangemments of apparatus for carrying out the invention. The invention consists in such novel methods and combinations of features ad method steps as may be shown and described in connection with the apparatus herein disclosed.

In the drawings:

Fig. 1 is a schematic representation of one form of system embodying the present invention and including, in schematic illustration, a longitudinal section of a ship's hold;

Figures 3A, 4:
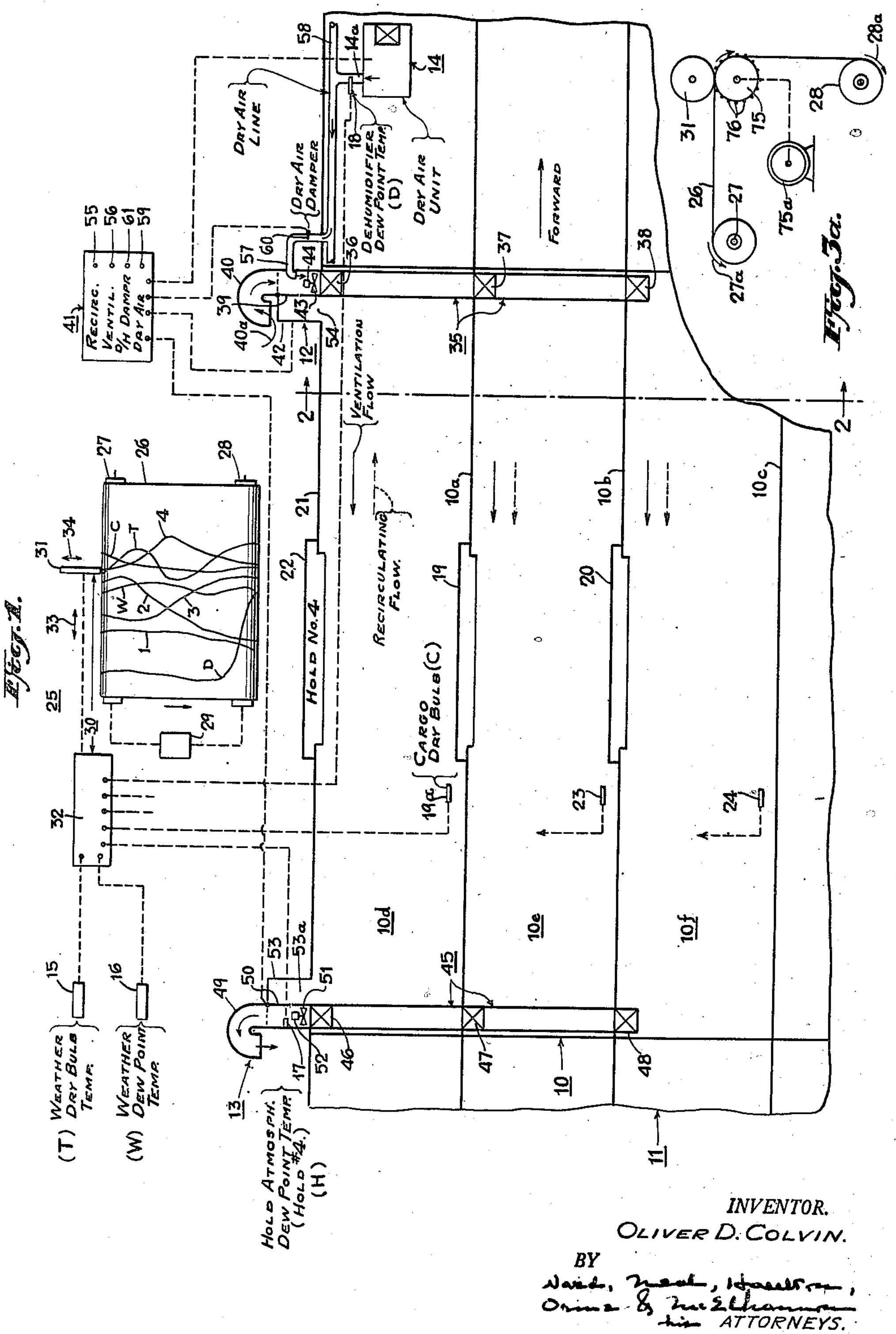
Figure 4:
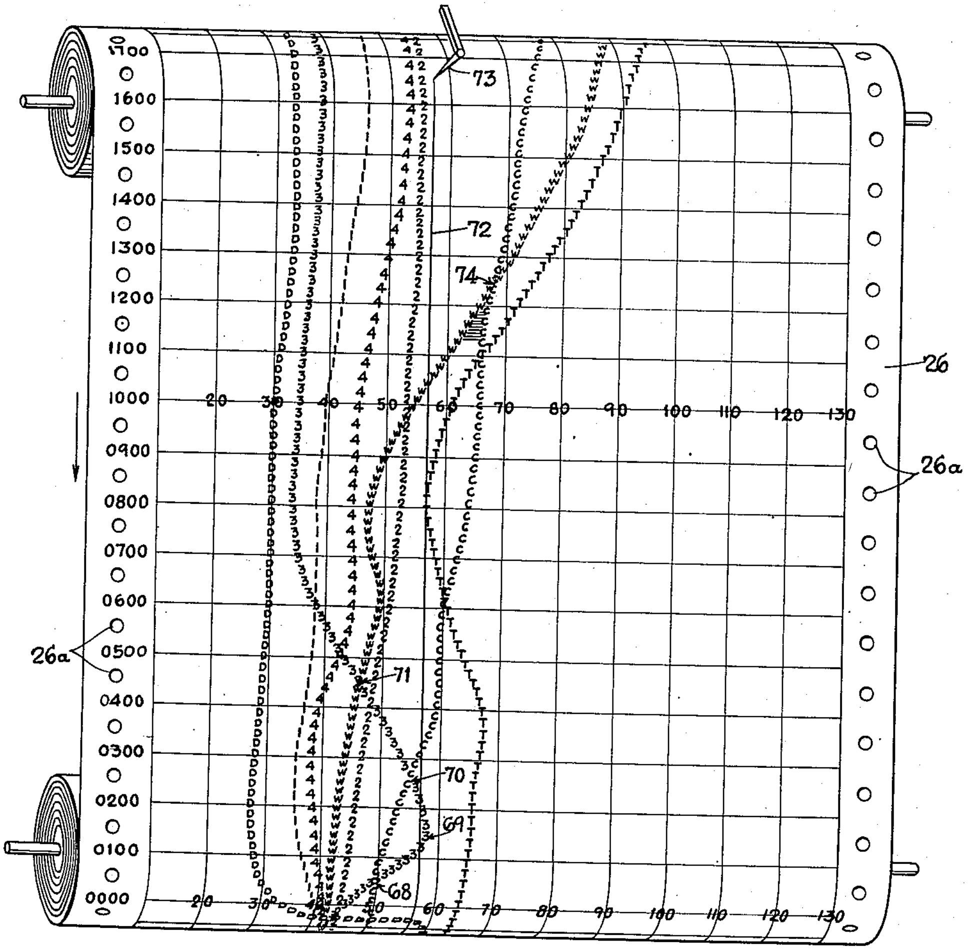
Figures 5, 6:
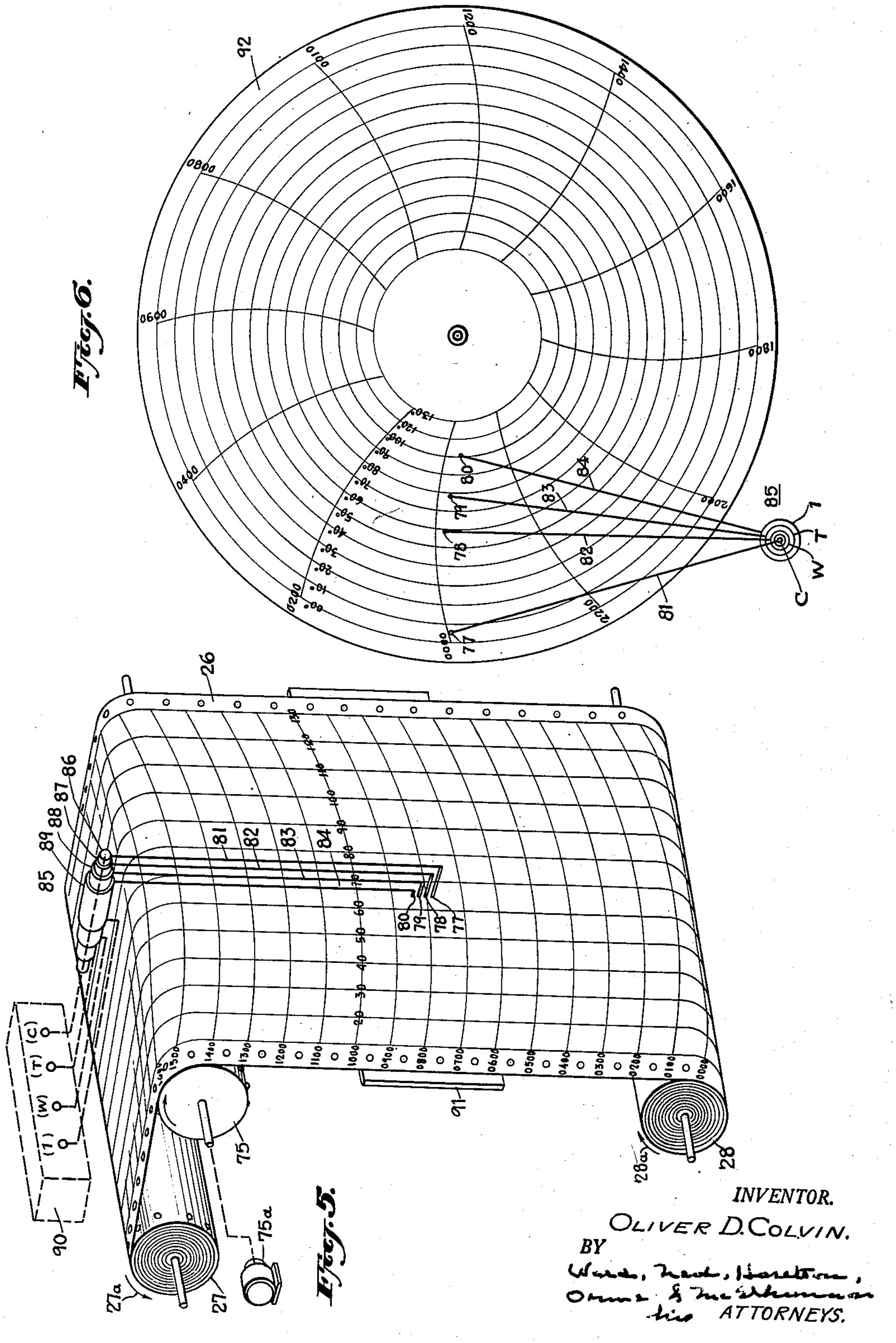

Fig. 3 is a perspective view, on an enlarged scale, of a scroll or strip chart having delineated thereupon a plurality of tracks with reference to a single graph, the varying magnitudes represented by the tracks being delineated with respect to a single temperature coordinate and a single time coordinate, such tracks providing a continuous time record of the selected temperature conditions, such conditions being delineated particularly with respect to the control of ship sweat (condensation upon the internal surfaces of a storage compartment);

Fig. 3*a* is a side view of a preferred form of means for mounting and moving a strip chart;

Fig. 4 is somewhat analogous to Fig. 5, the tracks delineated thereupon indicating a different set of temperature conditions and being drawn with respect to the control of cargo sweat (condensation upon the cargo);

Fig. 5 is a perspective view of a strip chart in the form of a scroll analogous to that shown in Figs. 3 and 4 but employing track delineating means comprising a modification over those shown in Fig. 1; and Fig. 6 is a plan view of a "circular chart" in the form of a flat disc upon which the aforementioned temperature tracks are delineated with respect to polar coordinates by track delineating means substantially similar to those shown in Fig. 5, it being understood, however, that the track delineating means shown in Fig. 1 may be employed with respect to such a circular chart.

The principles of operation upon which the present invention are based will now briefly be set forth, after which the method and apparatus will be described. This description relates the invention to operation aboard ship, particularly of the cargo carrying variety, although the invention is not limited thereto, it being applicable to control of certain atmospheric conditions in any compartment.

The air, as is well known, has the ability to pick up or release moisture. The amount of moisture that can be carried by the air is not constant but varies with its temperature; that is, warm air can retain more moisture than cold air. However, at any given temperature there is a limit to the amount of moisture the air can retain. When the air contains the maximum amount of moisture at any given temperature, it is said to be saturated and it is at its dewpoint temperature. At any condition below saturation when the air does not contain all that it could for that temperature, its moisture content is indicated by the term "percentage of relative humidity" which is the percentage of saturation.

The control of ship sweat and cargo sweat problems is intimately related to the temperature of the air and the amount of moisture that the air can retain, the reason being that as air is cooled, the amount of moisture that it can retain becomes less. Thus if the moisture content of a given volume of air does not change, its relative humidity will rise as the temperature falls. If the temperature is lowered sufficiently, the relative humidity will rise to 100% and the air will become saturated, thereafter producing a condensation as the temperature further falls. The temperature in degrees at which the air becomes so saturated and below which it has to give up some of its moisture (as a condensation), of course, comprises the dewpoint of the air.

Thus when a sample of air is cooled to a certain temperature, the relative humidity will reach 100% and the air, as aforementioned, becomes saturated. Further, if the air is cooled below this temperature, the excess moisture will be condensed usually in the form of a dew. Such dew comprises the aforementioned sweat. The latter consequently is nothing more than the condensate formed because the air in contact with a cold surface was cooled below its dewpoint. If the ship's structure is the surface, "ship sweat" forms. If the cargo provides the surface, the condensation is "cargo sweat."

Thus if the temperature of any object in the hold, including the cargo or the structure, is below the dewpoint temperature of the hold air in contact therewith, sweat will form on such object. For this reason, under many conditions, it is wrong to ventilate the hold with outside air. Furthermore, some cargoes are hygroscopic; that is, the cargo may absorb moisture from or release moisture to the hold air. Consequently the relative humidity of the hold air changes continually.

In order to be apprised of the pertinent atmospheric conditions within the hold there should be considered the type and temperature of the cargo, the temperature of the structure and the dewpoint of the hold air. The temperature of the upper ship structure is usually substantially the same as the dry bulb temperature (W) of the outside air.

Since it is impractical to control the temperature of the cargo or of the ship's structure, ship sweat and cargo sweat may be controlled by controlling the dewpoint of the hold air (H) and maintaining the same at a safe level. This is accomplished by employing:

(1) Ventilation means, that is, means for supplying and distributing air from the outside atmosphere (weather air) to the hold. The term "ventilation" as employed herein refers to the supplying of air from the outside atmosphere to the hold.

(2) Recirculation means, that is, means for recirculating within the hold the air already therein. The term "recirculation" as employed herein refers to the circulating within the hold of its own air.

(3) Dry air supply means, for example, an air dehumidifier or a bottle of liquid dry air. Such means provides a dry air supply for discharge into the hold to keep the dewpoint of the hold air at a level where sweat cannot form. The aforementioned ventilation or recirculation can be with or without the introduction of dry air from such dry air supply means. When dry air is so introduced it is preferably mixed in with a current of the ventilation or recirculation air. However, the system is capable of introducing dry air alone to a hold in the absence of either ventilation or recirculation.

(4) Instruments for sensing and recording (or indicating) the dry bulb and dewpoint temperatures (T and W) of the outside (weather) air; the dewpoint temperature (H) of the hold air; the dewpoint temperature (D) of the air emanating from the dry air supply means; and the dry bulb temperature (C) of the cargo.

In summary, ship sweat will occur when the dewpoint temperature (H) of the hold air is greater than the temperature (T) of the ship's hold surfaces; and cargo sweat will occur when the dewpoint temperature (H) of the hold air is greater than the dry bulb temperature (C) of the cargo surface.

In order to prevent ship sweat (or dry out such sweat after it has occurred):

(*a*) Ventilate the hold with outside air if W (the dewpoint temperature of such outside air) is less than H (the dewpoint temperature of the hold air); or (*b*) Recirculate the hold air, usually with the addition of dry air, when H is less than W.

In order to prevent cargo sweat (or dry out such sweat after it has occurred):

(*a*) Ventilate the hold with or without the addition of dry air when the temperature (C) of the cargo is greater than the dewpoint temperature (W) of the outside air. Ventilation can be done except in rough weather when it usually becomes mandatory to recirculate the hold atmosphere therein with or without the addition of dry air; or (*b*) Recirculate the hold air when the temperature (C) of the cargo is less than the dewpoint temperature (W) of the outside air. In this condition the weather air is excluded and such recirculation can be made with or without the addition of dry air.

Application of the above principles will prevent the formation of ship and/or cargo sweat and are applicable with respect to ships (or other storage compartments) which are fitted with the aforementioned recirculation and ventilation means.

In addition to drying out such sweat after it has occurred, it is extremely important, particularly concerning certain perishable cargoes, to know in advance the trends of atmospheric conditions which will in the future produce ship and/or cargo sweat whereby remedial action may be taken well in advance of the proposed occurrence of the damaging conditions. The present invention is particularly concerned with methods and means for controlling atmospheric conditions in ship holds or other storage compartments wherein such dangerous conditions are forecast by easily and instantaneously readable means and such advance remedial action can be taken. By means of the present invention it is possible to know what is going to occur atmospherically within a compartment in the imminent future, that is, several hours in advance. This is of substantial assistance to the operator of the system in view of the several types of conditions to which a ship is subject, namely, (*a*) diurnal changes, that is, daily changes in the weather normally associated with changes from night to day; (*b*) sea changes resulting from, for example, movement in and out of a warm stream, such as the Gulf Stream; and (*c*) other weather changes such as winds and seasons.

Also in view of the fact that the present invention enables the initiation of the aforementioned remedial action well in advance of the occurrence of damaging conditions, the apparatus, as aforementioned, can be of substantially lower capacity than has been heretofore required because "prevention" requires substantially less capacity than "cure." The prior art methods and devices in this general field have been concerned with taking action after the event rather than before. Thus, since the present invention enables the use of apparatus of substantially lower capacity, it can be also substantially less expensive, smaller, and thus easier to install.

Referring now to the drawings, one form of the system for carrying out the invention is shown in Fig. 1 which will now be described.

The hold 10 of a ship 11 is shown having means (generally indicated at 12 and 13) for ventilating the hold and alternatively for recirculating in such hold its own atmosphere, both means being operable with or without the addition of dry air from an air dehumidifier unit 14 to be more fully explained hereinafter.

Although only a single hold is shown in Fig. 1 (for purposes of simplicity), the invention will be described in connection with a ship having four separate holds.

Means are provided for delineating upon a common chart surface a plurality of time tracks of the various temperatures (dewpoint and dry bulb) whereby the operator of the system can at a glance instantly and continuously determine the past and present atmospheric conditions in the holds and is enabled to forecast within the imminent future what is going to happen therein and thus can take suitable remedial action, if necessary. Such track delineating means is schematically shown in Fig. 1 and comprises illustratively:

(*a*) A thermometer 15 for sensing the dry bulb temperature of the outside atmosphere (weather dry bulb temperature)—abbreviated as T. This is substantially equal to ship hull temperature.

(*b*) A humidity sensitive cell 16, such as a "Dewcell," for sensing the dewpoint temperature of the outside atmosphere (weather dewpoint temperature—abbreviated as W);

(*c*) A humidity sensitive cell 17 for sensing the dewpoint temperature of the hold atmosphere (abbreviated as H or by a numeral 1, 2, 3 or 4, the numeral being selected to correspond to the number of the hold);

(*d*) A further humidity sensitive cell 18 for sensing the dewpoint of the dry air discharged from the air dehumidifier unit 14 (abbreviated as D);

(*e*) A dry bulb thermometer 19 for sensing the temperature of the cargo in the hold 10 (abbreviated as C).

It will be noted that the hold 10 is provided with three decks **10*a*, 10*b* and 10*c*, the first two having conventional central hatch openings which are covered by removable hatch covers 19 and 20 respectively. A weather deck 21 is provided with an aligned central hatch which is covered by a removable hatch cover 22. Thus the hold 10 is divided into three separate cargo spaces 10*d*, 10*e* and 10*f*. For purposes of simplicity, the description will concern itself with the cargo dry bulb temperature within the upper space 10*d* as sensed by the thermometer 19*a*. However, thermometers for the other spaces may be provided, for example, thermometers 23 and 24, respectively, in the spaces 10*e* and 10*f***.

The various temperature sensing means, including both the dewpoint sensing cells and the thermometers, are operatively connected to a track recorder, indicated generally at 25, which, in the particular form shown, embraces the following elements:

(*a*) A strip chart 26 in the form of a scroll which is originally wound upon a primary cylindrical core 27 and which unwinds downwardly upon a spaced and parallel secondary cylindrical core 28, the motion being controlled in accordance with time as by a suitable clock means 29 which drives the scroll at a constant rate. The strip chart 26 is calibrated with reference to a single graph, the vertical coordinate comprising time and the horizontal coordinate temperature. Thus all of the varying magnitudes aforementioned are delineated thereupon with respect to a common graph scale having a common origin point.

(*b*) Means for delineating the various tracks upon the strip chart 26 having a common system of coordinates, which means are generally designated by the numeral 30, which embraces a movable type wheel 31 and control means 32 therefor. The type wheel 31 has embossed on the periphery thereof a plurality of symbols, one for each of the factors which are to be delineated as tracks upon the chart 26. For example, in the particular form shown, there are embossed upon the periphery of such wheel, illustratively, the aforedescribed abbreviations W, T, H and D, together with the numerals 1, 2, 3 and 4, such numerals corresponding to the holds bearing such numbers. The type wheel is capable, under the influence of the control means 32, of axial movement in the direction of the arrow 33 and radial movement in the direction of the arrow 34. Furthermore, such wheel is capable of angular movement about the axis thereof for the purpose of placing a selected symbol in position for printing upon the scroll 26, the roll 27 serving a backup function. If we assume, for purposes of illustration only, that there are eight separate symbols, namely, W, T, C, D and 1, 2, 3 and 4, the control means 32 will provide eight tracks upon the strip chart 26. Such tracks are provided by the control means 32 moving the type wheel 31 to a plurality of successive positions, each one being characteristic of the particular sensing means temperature which is momentarily selected for recording upon the scroll. I have found it desirable, for example, at fifteen second intervals, to sense successively the aforementioned eight separate temperatures (dewpoint and dry bulb) and to make characteristic marks upon the scroll for each. Thus, for the sensing of weather dry bulb temperature (T) the type wheel 31 will be angularly shifted so that the T is presented for printing upon the scroll 26, suitable inking means (not shown) being provided for the type wheel. The type wheel 31 also will be shifted axially to the proper type wheel position corresponding to the weather dry bulb temperature (T) with respect to the temperature scale upon the strip chart. When the type wheel is thus correctly positioned, with respect to the strip chart, it is moved radially from its normal position, which is slightly removed from the chart, into temporary engagement therewith, thereby to print a T. The same procedure is followed with respect to the printing of all of the other symbols. It is evident that in this example only one and three-quarter minutes (7×15) will separate the recording of the first symbol from the recording of the last in a single run of symbols. The type wheel moves somewhat in a pecking motion under the influence of the control means 32. A new run of symbols may be sensed and printed commencing, for example, fifteen seconds after the completion of the last run, thereby producing a two minute interval between successive printings of a given symbol whereby the substantially continuous tracks shown are marked upon the chart as in Figs. 3 and 4. For illustrative purposes the figures do not show such frequency of printing. The control means 32 comprises means for converting the values of the signals from the dewpoint temperature sensing means to the same scale as that of the signals from the dry bulb temperature sensing means, thereby adapting such values for comparison with one another on a common scale. Of course, conversely the values of the signals from the dry bulb temperature sensing means can be converted to the same scale as that of the signals from the dewpoint temperature sensing means, if desired.

The aforementioned recirculating and ventilating means will now be described.

Figure 2:
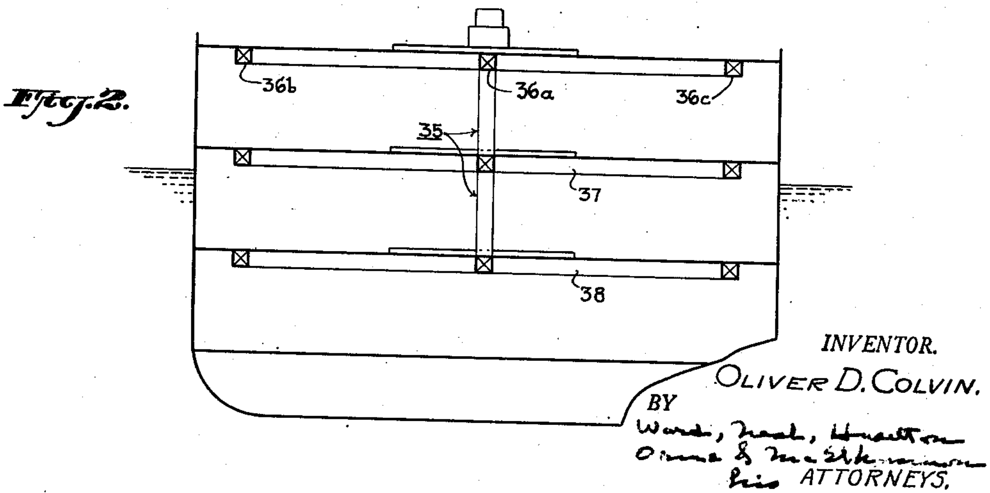
Fig. 2 is a sectional view taken substantially on line 2—2 of Fig. 1.

A primary air duct assembly 35 is provided which, in the form shown in Fig. 1, extends substantially vertically and is in the forward region of such hold. The primary air duct assembly is in communication with the several cargo spaces **10*d*, 10*e* and 10*f* preferably near the top portions thereof by transversely extending subducts 36, 37 and 38, respectively, which, in the manner shown in Fig. 2, are provided with orifices amidships and at the outboard extremities of such subducts. For example, the subduct 36 is provided with an amidship outlet orifice at 36*a* and with outboard orifices 36*b* and 36*c***.

The air duct assembly 35 can be placed in communication with either the outside atmosphere or the hold by means of a damper 39 which can be alternatively positioned, as shown in solid lines in Fig. 1, or in broken lines. When in the former position, the air duct assembly 35 is placed in communication with an inlet duct 40 having an orifice **40*a* in communication with the outside atmosphere. It is through this latter duct that air for ventilating purposes is directed into the hold. Damper 39 is operatively connected to suitable control means which preferably is situated on the bridge of the vessel whereby it can be shifted to either one of the aforementioned positions. A control panel 41 is shown having thereon a control for the damper 39** as will appear more fully hereinafter.

The aforementioned damper 39 is preferably situated within a suitable damper housing 42 upon which the inlet duct 40 is mounted and which housing provides communication between the inlet of the duct assembly 35 (at its top) and the hold **10*d* in response to the damper 39** being moved to the position shown in broken lines in Fig. 1.

Means for moving the air in the primary air duct 35 are employed comprising a fan 43 which is connected to an electric motor 44. The fan 43 preferably is situated just beneath the damper 39.

An analogous duct system is located preferably in the after portion of the hold 10 and comprises a secondary air duct assembly 45 having transversely extending subducts 46, 47 and 48 which are analogous to the subducts 36, 37 and 38, respectively.

The exhaust extremity of the secondary duct assembly 45 (at the top thereof) can be placed alternatively in communication with an atmospheric exhaust 49 or with the hold 10 by means of a damper 50 which is analogously mounted as compared to the damper 39. That is, in the form shown in Fig. 1, the damper 50 can assume the position shown in solid lines or in broken lines. When in the position shown in solid lines, the exhaust extremity of the secondary air duct 45 is in communication with the exhaust outlet 49 and when in the latter position, such exhaust extremity is in communication with the hold.

The positions of the dampers 39 and 50 are as follows:

(*a*) The hold 10 is "on ventilation" when the dampers 39 and 50 are both in the positions shown in solid lines in Fig. 1; and (*b*) The hold is "on recirculation" when said dampers 39 and 50 are in their alternative positions, that is, in the positions shown in broken lines.

Thus when "on ventilation" the outside atmospheric air will be drawn into the primary air duct 35 by the fan 43 and will be directed via the duct and subducts to their various outlets and thence aft toward the secondary air duct 45 where such air will be collected and directed under the influence of an exhaust fan 51 to the exhaust outlet 49. The exhaust fan 51 is driven by a suitable electric motor 52.

Alternatively, when the said ducts are in the "recirculation" position, as shown in broken lines, the air of the hold will be recirculated therein under the influence of the fans 43 and 51. That is, the exhaust extremity of the secondary air duct 45 will be in communication with the upper region of the cargo space **10*d* via the after-damper housing 53 which defines a passage 53*a*. The supply fan 43, instead of being in communication with the outer atmosphere, will be in communication with the forward and upper region of the cargo space 10*d* via passage 54 which is defined by the aforementioned housing 42**.

It will be seen that the upper cargo space **10*d* serves as a return conduit for the movement of the atmospheres taken from the lower two cargo spaces 10*e* and 10*f*** during recirculation.

I have found it desirable to control the aforementioned dampers 39 and 50 by means situated on the damper control panel 41 on the bridge whereby an operator, by controlling suitable push buttons or switches upon such panel, is capable of remotely controlling the dampers to place the hold "on ventilation" or "on recirculation." Consequently the damper 50 is also operatively connected to the damper control panel 41, suitable push buttons 55 and 56 being respectively provided thereon for placing the dampers 39 and 50 in their recirculation and ventilation positions respectively.

I have found it desirable to introduce dehumidified air into the system just above the supply fan 43 although it is possible to introduce it at any other suitable location. Consequently a dry air inlet conduit 57 is provided having an outlet directly above such supply fan. The conduit 57 in turn is connected to a main dry air line 58 which extends fore and aft of the ship and which feeds dry air to the various other holds under circumstances analogous to those shown and described in connection with Fig. 1. The aforementioned dehumidifier unit 14 is connected via an outlet conduit **14*a* to the fore and aft line 58**.

The dehumidifier 14 can be placed in or out of operation by control of a suitable push button or switch means, as at 59, located, for example, on the control panel 14. Furthermore, there may be provided in the conduit 57 a dry air damper 60 which is governable by a push button 61, also located on the panel 41.

The means for angularly shifting the various dampers above mentioned may be of any suitable type, for example, of the pneumatic variety, wherein the control of the actuating medium is easily effected through electrically actuated devices under the influence of the aforementioned control buttons.

SHIP SWEAT

The novel apparatus and method will now be described with particular reference to ship sweat problems and to Fig. 3 wherein there are delineated upon the chart, tracks corresponding to the following:

The weather dry bulb temperature —T,

The weather dewpoint temperature —W,

The dewpoint temperature of the dehumidified air —D, and

The dewpoint temperatures (1, 2, 3 and 4) of the atmosphere in the four holds of corresponding numbers.

Cargo sweat problems will be later set forth in connection with Fig. 4.

*Re: Hold No. 1.*—The track of the dewpoint temperature of this hold, for the time shown on the chart, is indicated by the series of numerals "1" which are printed thereupon by the apparatus described above in Fig. 1. Track 1 indicates that the dewpoint temperature of the atmosphere of hold 1 is substantially below both the weather dewpoint temperature (W) and the weather dry bulb temperature (T). Consequently there is no danger of ship sweat in view of the low dewpoint of the atmosphere of this hold. This is true because the weather dry bulb temperature (T) is substantially identical to the temperature of the ship itself (at least that portion above water) and thus of the bounding surfaces which define such hold or storage compartment. Thus in effect a comparison is made between the dewpoint temperature of the hold atmosphere and the dry bulb temperature of the bounding surfaces of the compartment. Since the latter surfaces are substantially warmer than the dewpoint temperature of the hold atmosphere, it is not possible for ship sweat to occur thereon.

The reason for comparing track 1 with tracks W and T is for the purpose of making a decision as to what to do regarding:

(*a*) Ventilation;

(*b*) Recirculation; or (*c*) Inaction, i. e., neither (*a*) nor (*b*).

Since track 1 is to the left of both of the other tracks W and T, it is desirable to initiate recirculation in this hold and so to continue because the atmosphere within hold 1 is considerably lower in dewpoint than that of the outside atmosphere and considerably lower in temperature than the weather dry bulb temperature. Recirculation will insure that there are no localized stagnant volumes of air where dewpoint temperature of such volumes may rise above the temperature of any tactile surface causing sweat. It would thus be ill advised to ventilate because this would introduce into the compartment air having a higher dewpoint temperature. Furthermore, by observing the most recent portions (track heads) of the aforementioned three tracks (1, W and T), it is easy to forecast that track 1 is not trending toward either of the other two tracks whereby remedial action must be taken to stave off formation of ship sweat. Such forecast can be made for the imminent future usually embracing several hours.

*Re: Hold No. 2.*—The dewpoint track of the atmosphere of hold No. 2 (track 2) indicates that from 0000 up to 1300 there should be recirculation but at 1300 a change should be made to ventilation. The reasons for this are that the dewpoint temperature of the hold air is lower than that of the weather (outside) air up to 1300 and thus should be used in recirculation. However, after the latter time the weather air becomes lower in dewpoint temperature and thus should be introduced into the compartment by ventilation. The trend of these two tracks can be easily determined well in advance of the crossing point 62 which thus can be easily forecast several hours in advance. The aforementioned recirculation and ventilation occurring in hold No. 2 can be with or without the introduction of dry air from the dehumidifier 14.

*Re: Hold No. 3.*—Track 3 starts out about 0000 between track W and track T, thus indicating that the air in this hold is of higher dewpoint and wetter than the weather air up to 0500 when track 3 crosses track W at 63. Consequently hold 3 should be started on ventilation at 0000 and so continued until 0500 when the change should be made to recirculation because after 0500 it is no longer desirable to employ the wetter outside air. Track 3, after 0500 remains, for the balance of the time shown, to the left of track W and thus hold 3 should be continued on recirculation.

*Re: Hold No. 4.*—An inspection of track 4 indicates that dewpoint conditions in this hold apparently were overlooked from 0000 up to about 1100 (point 64). The day apparently was started without either ventilation or recirculation in this hold. From 0000 up to 0545 no ship sweat occurred because the internal surfaces of the compartment (track T) were warmer than the dewpoint temperature (4) of the hold atmosphere. However, at 0545 track 4 crossed track T at point 65 and the internal surfaces of the compartment became cooler than the dewpoint of the temperature of the hold atmosphere and condensation upon such internal surfaces commenced. At about 1115 (point 64) the operator of the system took remedial action which is reflected by a sharp decline thereafter of track 4. An operator of the system, upon observing such conditions at 1100 in hold 4, should take the following action:

(*a*) Direct from dehumidifier unit 14 all of the dry air which can be allocated to this hold commensurate with the minimum needs of the other holds.

(*b*) Place hold 4 on ventilation in order to take advantage of the outside air which at this time is of considerably lower dewpoint temperature than that of the hold air, By 1245 (point 66) track 4 has crossed track T thereby arresting the formation of further ship sweat at this time and thereby initiating the drying out of the sweat already formed in hold 4. Subsequent to point 66, the sweat already formed in hold 4 will be dried out and removed.

If we assume that track C designates cargo dry bulb temperature of the cargo in hold 4, it is seen from the relative position of the tracks C and 4 that condensation upon the cargo will have existed since 0000 up to 1400 (point 67) where track 4 crosses track C and the dewpoint temperature of the atmosphere of hold 4 becomes lower than the dry bulb temperature of the cargo. That is, the formation of cargo sweat will cease at point 67 and there will be initiated at this time (1400) the drying out of such cargo sweat.

When the cargo dry bulb temperature C is above the weather dry bulb temperature T, it is impossible for cargo sweat to occur on ventilation because W is normally always below T although it is possible for W to move into equality with T thereby showing 100% relative humidity. If W rises above T, precipitation will occur.

CARGO SWEAT

Referring now to Fig. 4, the invention will be described with respect to certain cargo sweat problems in the several holds.

Although two charts are shown in the drawings (Figs. 3 and 4), only one chart is normally employed in this invention. The purpose of the chart shown in Fig. 4 is to emphasize the aforementioned several cargo sweat situations which may occur in the several holds. The symbols employed for delineating the several tracks of Fig. 4 are similar to and have similar meanings to those shown in Fig. 3.

In Fig. 4 only a single cargo temperature track is shown whereas in actuality there would be a plurality of such tracks, at least one for each hold. If a given hold is divided into three separate spaces, as shown in Fig. 1, there may be three cargo temperature tracks for each particular hold. However, for simplicity only a single cargo temperature track is shown in Fig. 4 which will suffice for the description of the several problems set forth below. Thus the single cargo temperature track is illustrative of and applicable to any cargo compartment.

*Re: Hold No. 1.*—It should be noted that while the cargo temperature track (C) of Fig. 3 indicates that the cargo was initially at 88° F. and thus was presumably loaded warm, the cargo track shown in Fig. 4 indicates that the cargo temperature at 0000 was about 50° F. and presumably was loaded in cooler weather.

Regarding hold 1 (Fig. 4), during the time shown (0000–1700), the cargo dry bulb temperature (C) is substantially greater than the dewpoint temperature of the atmosphere of hold 1. Consequently no action need be taken with respect to hold No. 1, that is, the operator of the system can maintain whatever condition exists with respect to recirculation or ventilation so far as cargo sweat is concerned. It appears that recirculation for hold No. 1 is a more desirable course because the dewpoint temperature of the atmosphere of hold No. 1 is lower than that of the weather air. Thus no good purpose would be served in reducing the dryness of the atmosphere of hold No. 1 by ventilating same with outside air. There is no danger of ship sweat in hold No. 1 in view of the greater warmth of the compartment's bounding surfaces as delineated by track T. The trend of the head of track 1 (the most recent portion thereof) with respect to the heads of tracks C and T indicates no imminent danger of ship or cargo sweat.

*Re: Hold No. 2.*—Track 2 indicates that the dewpoint temperature of the atmosphere of hold No. 2 from 0000 up to about 0945 is somewhat greater than the dewpoint temperature of the weather air (track W). Thus during this time hold No. 2 should be on ventilation preferably with the addition of dry air. However, at about 0945 track 2 crosses track W and the dewpoint temperature of the hold 2 atmosphere becomes lower than that of the weather air and thus after 0945 hold 2 should be on recirculation preferably with the addition of dry air until the situation changes, at which time the aforementioned principles should be applied. Thus the operator of the system will actuate the pertinent control buttons upon the panel 41 (Fig. 1) and will maintain ventilation during the period aforementioned (0000 to 0945) and will discontinue same and actuate the recirculation button 55 about 0945, the dehumidifier unit 14 preferably being in operation during all of this time.

An observation of the track head of track 2 and of track C throughout the period set forth in Fig. 4 indicates that at no time is there imminent danger of the cargo becoming cooler than the dewpoint temperature of the hold air and thus the danger of cargo sweat does not exist during this period.

*Re: Hold No. 3.*—No particular problems are presented by the atmospheric conditions in holds 1 and 2. However, track 3, showing the dewpoint temperature in hold 3, indicates the occurrence of a cargo sweat problem as follows: From the start of the day at 0000 up to 0035 (point 68), although there was no cargo sweat, the trend of the heads of track 3 and track C indicates the imminence of such sweat. However, it appears that no remedial action was taken in the light of such trend. At point 68 track 3 crosses track C and the dewpoint temperature of the hold 3 atmosphere then becomes higher than the temperature of the cargo (until about 0245). Consequently cargo sweat will occur between about 0035 and 0245. At about 0130 (point 69) some remedial action was taken for the purpose of depressing the dewpoint temperature of the hold 3 atmosphere below the dry bulb temperature (C) of the cargo. This remedial action consisted of placing hold 3 on ventilation and adding dry air thereto from the dehumidifier unit 14, this being accomplished by operating the pertinent control buttons upon the control panel 41 or by suitable manual operation. It is understood that although the control panel 41 indicates connections to the several dampers and motors only of hold No. 4, analogous controls are provided for all of the other holds. Of course, only a single control is provided for the dehumidifier unit 14. It should be noted that the several dampers shown in Fig. 1 with respect to hold No. 4 may be controlled either at a remotely positioned control panel 41 or locally at the location of the damper itself, for example, by manual means.

Reverting to point 69 of track 3, an observation of this point in comparison with a substantially concurrent point upon the track W indicates the desirability of placing the compartment on ventilation because the weather air at this time (0130) is substantially lower in dewpoint temperature than that of the hold air. As much dry air as is available from the dehumidifier unit should be directed into hold No. 3 for the purpose of depressing the dewpoint temperature of hold No. 3 atmosphere commencing at point 69. Such introduction of dry air, of course, must be commensurate with the minimum needs of the other holds. It is, of course, possible to remedy the situation existing at (0130) in hold No. 3 without the addition of dry air because the aforementioned ventilating of this hold will eventually accomplish the desired purpose but substantially more slowly than if dry air from the dehumidifier were added. Consequently, immediately after 0130, the dewpoint temperature of the atmosphere of hold No. 3 starts downward and at about 0245 (point 70) the further formation of cargo sweat ceases and the drying out commences of the previously formed sweat upon the cargo. The aforementioned ventilation of hold No. 3 should persist so long as the weather air is of lower dewpoint temperature than the air of hold No. 3. Thus such ventilation should continue until about 0430 (point 71) at which time hold No. 3 should be changed from ventilation to recirculation. In view of the conditions existing in hold No. 3 from 0430 to the end of the time shown, recirculation should be continued, there being no trend indicated which forecasts either cargo sweat or ship sweat. The injection of dry air into hold No. 3 and the recirculation of its atmosphere normally would be continued until the sweat previously deposited on the cargo was fully dried out.

*Re: Hold No. 4.*—The remarks above given for hold No. 1 are also applicable to hold No. 4.

*Re: Uniform cargo temperature track.*—In lieu of the aforedescribed method and means for controlling the hold atmosphere to prevent cargo sweat, reference being had to track C (cargo dry bulb temperature—variable), I have found it more economical and desirable though to a lesser degree to delineate upon the chart 26 a steady dry bulb temperature track 72 by means of a relatively fixed but manualy adjustable pen 73 (Fig. 4) which is manually positioned to mark a steady track of the dry bulb temperature of the port where the cargo was loaded or of the temperature of the warehouse where the cargo was stored just before loading. It is normal for a cargo vessel, of course, to take on numerous parcels of cargo, each one being loaded at a different port and at a different temperature. Consequently it is wise to mark track 72 at a temperature corresponding to the parcel which is most likely to be subject to cargo sweat, for example, the parcel having the lowest dry bulb temperature. Also it is within the scope of the invention to mark a plurality of such tracks, each one indicating the temperature of the place where a parcel of cargo was loaded.

It is considered good practice to mark a single steady track for each of the holds, each track indicating the coolest parcel of cargo in its respective hold. Consequently, if such coolest parcel were prevented from sweating, the other parcels would be protected.

In Fig. 4 the steady track 72 indicates, for example, a uniform temperature of about 57° and if, for illustration only, we assume that this is the temperature of the coolest parcel in any of the holds 1, 2 or 4, there is no danger of cargo sweat forming upon such parcel because it is at all times warmer than the dewpoint temperature of the atmosphere in the holds 1, 2 and 4. However, if we assume illustratively that it is the temperature of a cargo parcel in hold 3, a trend toward cargo sweat producing conditions (for each parcel) is seen between 0000 and about 0110 with such sweat forming upon such parcel commencing at the latter time and persisting until about 0200. The aforedescribed remedial action which occurred at point 69 is applicable with respect to the steady track 72.

It is within the purview of the invention to employ a steady dry bulb temperature track 72 of one cargo parcel in combination with track C (Fig. 4) indicating the varying dry bulb temperature of a parcel of cargo.

*Re: Trend of track W with respect to track C.*—The rule should be borne in mind: Never ventilate a hold when the weather track W rises above the cargo track C (or track 72). When the weather dewpoint temperature W rises above the cargo dry bulb temperature C, it is clear that cargo sweat will occur if the hold is ventilated with weather air. Consequently recirculation is indicated during such condition. In Fig. 4, commencing at about 1230 (point 74) weather dewpoint temperature (W) rises above the cargo dewpoint temperature (C) and recirculation should be employed in the pertinent holds in view of the fact that tracks 1–4, inclusive, indicate lower dewpoint temperatures than that of the weather air (W). If, for economy, there are no tracks C but only track 72, then recirculation should be commenced no later than 1030 according to Fig. 4. Of course, it is conceivable that a hold atmosphere track head might indicate a higher hold dewpoint temperature than that of the weather air whereupon it would be preferable to ventilate instead of recirculate, the latter comprising the only exception to the aforementioned rule that the hold should never be ventilated when the weather track W rises above the cargo track C.

Referring to tracks C and W in Fig. 4 at approximately 1100, the trend is apparent that these tracks will cross. Thus the operator is forewarned that there should be no ventilation with weather air in any hold following the anticipated crossing of track W by track C wherein the latter assumes the lower value. Such tracks cross at about 1230 (point 74).

Referring now to Fig. 3*a*, although Figs. 1, 3 and 4 show the scroll or strip chart unwinding from a primary cylindrical core 27 and being wound upon a secondary cylindrical core 28 without any intervening rolls for moving same, it has been found desirable to position such cores 27 and 28 as shown in Fig. 3*a* and to pass the scroll 26 over a toothed time roll 75 which preferably is positioned immediately beneath the type wheel 31. Suitable teeth or short studs 76 are positioned around the periphery of the time roll 75 at each extremity thereof, the studs engaging perforations **26*a* (Fig. 3) in the scroll 26. Suitable means may be employed for imposing a relatively small drag (in the direction of arrow 27*a*) upon the core 27 and a pull (in the direction arrow 28*a*) upon the core 28, the accurate timing of the movement of the scroll being under the influence of a time motor 75*a* which drives the time roll 75**.

Referring now to Fig. 5, there are shown means for delineating the several tracks by continuous or uninterrupted lines as compared to the means shown in Fig. 1. The means for mounting the scroll 26 are identical to that described above in connection with Fig. 3*a*.

A plurality of pens 77, 78, 79 and 80 are employed which are respectively mounted upon stylus arms 81, 82, 83 and 84. Such arms are concentrically mounted, as shown generally at 85, the arm 81 being secured to a central shaft 86 and the remaining three arms being respectively secured to concentric sleeves 87, 88 and 89. Such shaft 86 and concentric sleeves 87, 88 and 89 are operatively connected to a stylus or track control means 90 which is analogous in function to the control means 32 of Fig. 1, such shaft 86 and concentric sleeves being angularly shifted respectively in response to "C," "T," "W" and "1" thereby to produce continuous tracks showing the dry bulb and dewpoint temperatures which such symbols signify as above set forth. Such continuous tracks are distinguished preferably by using different colored inks.

In view of the concentrically mounted shaft and sleeves 85, the transversely extending lines upon the scroll 26 are arcuate and of appropriate radius.

Situated behind the scroll 26 and pens 77–80 is a suitable backup surface member 91.

Although in Fig. 5 there appears to be a substantial distance between the tip of pen 77 and that of pen 80 when such pens are in alignment, such pens may be constructed to be substantially nearer together, the drawing being for illustration only. It would appear from the drawing that such pens 77 and 80 are separated by about 45 minutes as measured upon the time scale at the left of the scroll. However, this is substantially less in a full scale model of the device. As a practical matter, such pens may be separated to the degree shown without an undue handicap to the proper operation of the system, the trends of the various tracks being readily apparent.

In lieu of the scroll or strip chart shown in Figs. 1, 3, 4 and 5, it is possible to employ a "circle chart" 92 (Fig. 6) in the form of a flat disc which rotates about its center, there being suitable polar type coordinates thereupon. However, it should be noted that it is not an essential element of the invention that either the time or the temperature coordinates be actually shown upon any of the charts, the trends and relative positions of the tracks being the important subject of observation. In Fig. 6 the concentric mounting 85 of Fig. 5 may be employed having the stylus arms 81–84 secured thereto as above described, the pens 77–80 thereof being provided for marking the several tracks upon the circle chart 92. The latter chart is mounted upon a suitable rotatable member which is angularly shiftable in response to time thereby providing the circumferential time coordinate. The radial coordinate is graduated in accordance with the temperature, in the form shown, from 0 to 130° F. the chart of Fig. 6 is adapted for twenty-four hour use.

The novel method and apparatus set forth herein can be employed on ships or in storage compartments without an air dehumidifier unit to feed dry air into the compartment. In the latter case the invention will greatly assist in preventing ill judged timing of ventilation or recirculation.

This invention can be employed on ships:

(*a*) With only natural ventilation means, that is, ventilation dependent upon the relative speed of the surrounding atmosphere over the ship;

(*b*) With mechanical (power fan actuated) ventilation means, or (*c*) With mechanical ventilation means plus recirculation means, (*d*) Having a dehumidifier unit which will provide dry air for either (*a*) or (*b*) or (*c*).

From the above it will be seen that regarding ship sweat, the two critical reference tracks are:

(*a*) Track W (weather dewpoint temperature) and (*b*) Track T (weather dry bulb temperature), the latter being substantially the same as the temperature of the internal surfaces of the storage compartment.

The position of a particular hold track with respect to (*a*) and (*b*) above is the determining factor of operation regarding ship sweat, that is, whether such hold track is:

(1) Below both;

(2) Between the two;

(3) Approaching either; or (4) Above both.

Regarding cargo sweat, the two critical tracks are W and C as compared to the position of the hold track.

Although the invention has been described in connection with ship holds and with respect to the atmosphere as the principal gaseous medium, the invention is not limited thereto. For example, it is possible to apply the concept of the invention to the aqueous dewpoint of gases other than the atmosphere. Gaseous substances other than air have dewpoint temperatures and the present invention can be applied to the controlling of sweat conditions when such other gaseous substances are involved. Furthermore, the various tracks heretofore described delineating the dewpoint temperature of the atmospheres of a plurality of holds may, in lieu thereof, represent several phases of dewpoint within a single compartment.

One of the important features of the present invention is concerned with the fact that dehumidifier apparatus used aboard ship are rationed as to their power consumption. Any device which is extravagant in power consumption is undesirable for marine use. Consequently since the novel method and apparatus enables the forecasting well in advance of hold atmospheric conditions dangerous to cargo, it is possible to take remedial action at a time when minimum power consumption will be needed for such remedial action. Thus the prognosticating aspect of the invention permits the employment of smaller apparatus of substantially lower expense in manufacture and of lower energy consumption (steam, electricity, cooling water) as compared to prior art devices lacking the prognosticating characteristic.

I have found it desirable, in addition to employing the symbols shown in Figs. 3 and 4 for delineating the several tracks, to print such tracks each in a distinctive color. For example, track C, T, W and D may be respectively printed in blue, red, purple and yellow ink and the several hold tracks may be printed in a common color, for example, green. This facilitates the instruction of unskilled personnel. It is easy for such personnel to carry out, for example, the following instructions:

(*a*) Recirculate the atmosphere in a hold whenever its green track head (hold dewpoint temperature) is to the left of the purple track head W;

(*b*) Ventilate a hold whenever its green track head is to the right of the purple track head (W);

(*c*) Such recirculation can be with or without the addition of dry air from the dehumidifier unit but is preferably with. Such ventilation is preferably with the addition of such dry air but may be without it if dry air is unavailable;

(*d*) When the green track head of a hold is to the right of the red track head (T) (weather dry bulb temperature), air from the dehumidifier unit should be introduced in the largest quantity available commensurate with the minimum needs of the other holds concurrently with ventilation with the lower dewpoint weather air. If such dry air is not available, then ventilate vigorously with the weather air alone.

Although the above described method and apparatus has been directed largely to the prevention of sweat upon the internal surfaces of the cargo compartment or upon the cargo itself by dewpoint control, it is within the purview of the invention to control the dewpoint to induce artificially the deposition of sweat upon the cargo where this is desirable. Also, it is sometimes desirable to provide a high relative humidity or high aqueous vapor pressure, or high dewpoint, for such cargoes as raw sugar or fruit or meats. The invention also is applicable to control dewpoint conditions to induce sweat within a compartment generally where desired.

Although the apparatus disclosed in Fig. 1 discloses the invention as applied to the hold of a ship having three superposed separate chambers, it is understood that the invention is not limited thereto, it being applicable to a storage compartment having but a single storage chamber wherein recirculation of the compartment atmosphere can be through any suitable means, for example, by a conduit within or without the storage compartment. Alternatively, it is possible to eliminate such a recirculation conduit and to employ any suitable means which effects recirculation of the atmosphere within the compartment.

The invention is applicable to ship holds (or other storage compartments) which are ventilated by either forced or natural ventilation, the former referring to ventilation by powered means such as a fan and the latter to ventilation as caused, for example, by the relative movement between a ship (or compartment) and the surrounding air. For example, a ship moving into the wind can induce strong natural ventilation of its holds. The normal procedure for best natural ventilation is to trim the mouth of the inlet ventilator toward the apparent wind and to trim the mouth of the outlet ventilator away from the apparent wind.

The practice of the invention also prevents corrosion of internal surfaces of storage compartments, for example in tankers, which may encounter moisture.

While the invention has been described with respect to certain preferred examples which have given satisfactory results, it will be understood by those skilled in the art, after understanding the invention, that various changes and modifications may be made without departing from the spirit and scope of the invention and it is intended therefore in the appended claims to cover all such changes and modifications.

What is claimed is:

1. In an air conditioning system for use in the storage of goods in a storeroom, such as the hold of a ship, where the air of the storeroom and the goods therein are conditioned by means of such air conditioning system, the latter being of the class including storeroom ventilation means for mixing outer air into the storeroom air or replacing such storeroom air entirely by outer air, or recirculation means for recirculating the air of the storeroom therein, such air conditioning system including means for sensing the dry bulb temperature (T) of the outer air, and means for sensing the dewpoint temperature (W) of the outer air, the combination with such sensing means of means for sensing the dewpoint temperature (H) of the air in the storeroom, each such means for sensing such dewpoint temperatures comprising apparatus responsive to the quantity of moisture present in the air, and means for producing signals responsive to such quantity of moisture and which are functions of the dewpoint of such air and for acting on said signals to cause same to represent its respective dewpoint temperature (H) or (W), such means for sensing such dry bulb temperature being operatively connected to means for producing signals responsive to such temperature, the means for sensing and producing signals responsive to such dry bulb temperatures comprising one set of means and the means for sensing and producing signals representative of such dewpoint temperatures comprising a separate set of means, means for converting the values of the signals from one of such sets of means to the same scale as that of the signals from the other set of such means, thereby adapting all such values for comparison with respect to a common scale, such several means for sensing temperatures and producing signals including such signal value converting means being operatively connected to means for recording such signals upon a common surface having a common point of origin and a common system of coordinates, namely, a time coordinate and a temperature coordinate, whereby such signals appear as a series of lines or curves upon such surface having such common point of origin and such common system of coordinates, and further whereby such lines or curves comprise in a single graph a record adapted for the act of rapid evaluating and forecasting of the atmospheric conditions in the storeroom by personnel with no knowledge of aerology and psychrometry so that said air conditioning system can be regulated by such personnel in accordance with the trends of such lines or curves in relation to each other.

2. In an air conditioning system in accordance with claim 1, such system including air dehumidifier means, means in such system so constructed and arranged that such recirculation or replacing of the air of the storeroom can be with or without the addition of dried air from such dehumidifier means, the combination therewith of means for sensing the dewpoint temperature (D) of the dried air of such dehumidifier means, such latter dewpoint sensing means also comprising the apparatus as defined in said claim.

3. In an air conditioning system adapted for use in conditioning air in a storeroom for the storage of goods, such as the hold of a ship, such system being of the class including storeroom ventilation means for mixing outer air into the storeroom air or replacing such storeroom air entirely by outer air, or recirculation means for recirculating the air of the storeroom therein, such system including means for sensing the dewpoint temperature (W) of the outer air, the combination therewith of means for sensing the dry bulb temperature (C) of the goods, primary means for producing signals representative of such dry bulb temperature, means for sensing the dewpoint temperature (H) of the air in the storeroom, secondary means for producing signals responsive to respective of said dewpoint temperatures, means for converting the values of the signals from one of such signal producing means to the same scale as that of the signals from the other signal producing means, thereby adapting all such values for comparison with one another with respect to a common scale, and means for recording upon a common recording surface marks representative of said respective signals whereby all of such temperatures are represented each by a respective line or curve formed by a series of such marks and having a common point of origin and a common system of coordinates, namely, a time coordinate and a temperature coordinate, whereby such lines or curves present a record permitting rapid evaluation of the relative trends of such lines and consequently the forecasting of the atmospheric conditions needing adjustment in the storeroom.

4. In a control system for air conditioning means of the class including ventilation means for a storeroom for mixing outer air with the storeroom air or replacing the storeroom air entirely by such outer air, or means for recirculating the air of the storeroom, with or without the addition of dried air from air dehumidifier means of such air conditioning means, whereby the air of such storeroom and also the goods therein are conditioned, the combination therewith of a primary set of temperature sensing and signal producing means embracing means for sensing and producing signals representative of the dry bulb temperature (C) of such goods, and a secondary set of means for sensing and producing signals representative of dewpoint temperatures and embracing: means for sensing and producing signals representative of the dewpoint temperature of the outer air (W) and such means for the dewpoint temperature (H) of the air of the storeroom and the dewpoint temperature (D) of the air emitted from said dehumidifier means, means for converting the values of the signals of one of said sets of temperature sensing and signal producing means to the same scale as that of the values of the signals from the other set of such means, a recording surface, means for continually advancing the latter, and means for recording all of such signals upon such surface, such signals all appearing as a series of lines or curves with a common point of origin and a common system of coordinates, namely, a time coordinate and a temperature coordinate.

5. In an air conditioning system of the class including ventilation means for a storeroom for mixing into the air of the storeroom air from outside the storeroom or replacing such storeroom air entirely by such outside air, or means for recirculating therein the air of the storeroom, the combination therewith of a first set of temperature sensing means embracing means for sensing the dry bulb temperature (T) of the outer air and the dry bulb temperature (C) of the goods; and a second set of temperature sensing means embracing means for sensing the dewpoint temperature (W) of the outer air, and means for sensing the dewpoint temperature (H) of the air in the storeroom; means operatively connected to each of such sensing means for producing signals responsive to each of such temperatures, means for acting upon the signals from the latter means connected to one of said sets of temperature sensing means for converting the values thereof to the same scale as that of the values of the signals from said signal producing means connected to such other set of sensing means, and means responsive to such signals for recording marks representative of said sensed temperatures upon a common recording surface whereby all of such temperatures will appear as a series of lines or curves formed by such marks in a single graph with a common point of origin and a common system of coordinates, namely, a time coordinate and a temperature coordinate, whereby such lines or curves present on such single graph a record permitting rapid evaluating and forecasting of the atmospheric conditions in the storeroom in accordance with the trends of such lines or curves in relation to each other.

6. In an air conditioning system of the class wherein air dehumidifier means are employed, such system being for use in conditioning the air in a storeroom for the storage of goods, such as the hold of a ship, such system including means for ventilation of the storeroom by mixing with the air therein air from outside the storeroom or replacing the storeroom air entirely by such outside air, or means for recirculating therein the air of the storeroom, in all cases with or without the addition of dried air from such air dehumidifier means, the combination therewith of a first set of temperature sensing means embracing means for sensing the dry bulb temperature (T) of the outer air and the dry bulb temperature (C) of the goods; and a second set of temperature sensing means embracing means for sensing the dewpoint temperature (W) of the outer air, means for sensing the dewpoint temperature (H) of the air in the storeroom, and means for sensing the dewpoint temperature (D) of the air emitted by said air dehumidifier means; means for producing signals responsive to each of such temperatures, means for acting upon the signals from one of said sets of temperature sensing means for converting the values thereof to the same scale as that of the signals from such other set of sensing means, thereby adapting all such signals and values for comparison with one another with respect to a common scale, and means responsive to such signals for recording marks representative of said sensed temperatures upon a common recording surface whereby all of such temperatures will appear as a series of lines or curves in a single graph with a common point of origin and a common system of coordinates, namely, a time coordinate and a temperature coordinate, whereby such lines or curves present on such single graph a record permitting rapid evaluating and forecasting of the atmospheric conditions in the storeroom by personnel with no knowledge of aerology or psychrometry so that said air conditioning system can be regulated by such personnel in accordance with the trends of such lines or curves in relation to each other.

References Cited in the file of this patent

UNITED STATES PATENTS

| | | |
|---|---|---|
| 2,160,831 | Colby et al. | June 6, 1939 |
| 2,528,018 | Stewart | Oct. 31, 1950 |
| 2,542,944 | Rieber | Feb. 20, 1951 |
| 2,554,440 | Coburn | May 22, 1951 |